(12) United States Patent
Foster et al.

(10) Patent No.: US 11,536,335 B2
(45) Date of Patent: Dec. 27, 2022

(54) BRAKE PAD BACKING PLATE

(71) Applicant: Federal-Mogul Motorparts LLC, Southfield, MI (US)

(72) Inventors: Jason Scott Foster, White Lake, MI (US); Stefan Ulrich Anger, Oxford, MI (US)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 0 days.

(21) Appl. No.: 16/376,507

(22) Filed: Apr. 5, 2019

(65) Prior Publication Data

US 2019/0309809 A1  Oct. 10, 2019

Related U.S. Application Data

(60) Provisional application No. 62/653,679, filed on Apr. 6, 2018.

(51) Int. Cl.
*F16F 9/32* (2006.01)
*F16F 9/06* (2006.01)
(Continued)

(52) U.S. Cl.
CPC ...... *F16D 65/092* (2013.01); *F16D 2069/004* (2013.01)

(58) Field of Classification Search
CPC .... F16D 65/092; F16D 65/097; F16D 69/004; F16D 69/005; F16D 69/007; F16D 65/0972; F16D 65/122
(Continued)

(56) References Cited

U.S. PATENT DOCUMENTS 2,451,326 A * 10/1948 Eksergian ............... F16D 65/02
188/234
3,198,294 A *  8/1965 Stacy .................... F16D 65/092
188/234
(Continued)

FOREIGN PATENT DOCUMENTS

CN        203348382 U    12/2013
CN        104747625 A     7/2015
(Continued)

OTHER PUBLICATIONS

Written Opinion corresponding to International Application No. PCT/US2018/039256, dated Oct. 26, 2018, 7 pages.
(Continued)

*Primary Examiner* — Robert A. Siconolfi
*Assistant Examiner* — James K Hsiao
(74) *Attorney, Agent, or Firm* — Reising Ethington, P.C.

(57) ABSTRACT

A backing plate and associated brake pad that includes a reinforcement plate and a retention plate. The reinforcement plate has an outboard surface, an inboard surface, and a mold hole. The retention plate has an outboard surface, an inboard surface, and a locking projection that cooperates with the mold hole of the reinforcement plate to mechanically lock the retention plate to the reinforcement plate so that the inboard surface of the reinforcement plate faces the outboard surface of the retention plate. A dampening layer may be included between the reinforcement plate and the retention plate.

13 Claims, 10 Drawing Sheets

US 11,536,335 B2

Page 2

(51) Int. Cl.
  *B60G 13/08* (2006.01)
  *F16D 65/092* (2006.01)
  *F16D 69/00* (2006.01)

(58) Field of Classification Search
  USPC .................................................. 188/250 b
  See application file for complete search history.

(56) References Cited

U.S. PATENT DOCUMENTS

| | | | | |
|---|---|---|---|---|
| 3,422,937 A * | 1/1969 | Gage | ................ | F16D 69/0416 188/250 G |
| 3,941,222 A * | 3/1976 | Newstead | ........... | F16D 69/0416 188/250 G |
| 3,964,580 A * | 6/1976 | Hahm | ................ | F16D 69/0408 188/73.1 |
| 4,146,118 A * | 3/1979 | Zankl | ................ | F16D 69/0408 188/250 G |
| 4,350,231 A * | 9/1982 | Crossman | ............ | F16D 65/092 188/218 XL |
| 4,552,252 A * | 11/1985 | Stahl | .................... | F16D 65/092 164/98 |
| 4,588,050 A * | 5/1986 | Urban | ................... | F16D 65/092 188/242 |
| 4,991,697 A | 2/1991 | Hummel et al. | | |
| 5,123,514 A | 6/1992 | Gatins, Jr. | | |
| 5,129,487 A * | 7/1992 | Kobayashi | ............ | F16D 65/092 188/250 B |
| 5,161,654 A | 11/1992 | Valentin | | |
| 5,261,512 A * | 11/1993 | Young | ................. | F16D 69/0416 188/234 |
| 5,285,873 A * | 2/1994 | Arbesman | ................ | B21C 23/20 188/250 G |
| 5,299,667 A * | 4/1994 | Hammond | ............. | F16D 13/64 188/218 XL |
| 5,343,985 A * | 9/1994 | Thiel | ..................... | F16D 55/227 188/72.5 |
| 5,355,986 A | 10/1994 | Biswas | | |
| 5,358,684 A | 10/1994 | Valentin | | |
| 5,485,899 A * | 1/1996 | Thiel | ..................... | F16D 55/227 188/234 |
| 5,515,950 A | 5/1996 | Kwolek | | |
| 5,535,858 A * | 7/1996 | Hummel | ............. | F16D 65/0006 188/250 B |
| 5,538,104 A * | 7/1996 | Katz | ....................... | F16D 65/02 188/250 B |
| 5,816,370 A | 10/1998 | Verbeeten et al. | | |
| 5,842,546 A * | 12/1998 | Biswas | ............... | F16D 65/0006 188/73.37 |
| 5,890,566 A * | 4/1999 | Yoshida | ................ | F16D 55/224 188/73.1 |
| 6,105,736 A * | 8/2000 | Akita | ................... | F16D 65/0006 188/251 A |
| 6,135,244 A * | 10/2000 | Le Bris | ............... | F16D 65/0006 188/250 B |
| 6,256,858 B1 * | 7/2001 | Brosilow | ............ | F16D 65/0006 188/250 E |
| 6,279,222 B1 * | 8/2001 | Bunker | ................ | F16D 65/092 29/527.5 |
| 6,367,600 B1 * | 4/2002 | Arbesman | ............ | B21D 28/10 188/250 B |
| 6,405,840 B1 | 6/2002 | Foster et al. | | |
| 6,464,047 B1 | 10/2002 | Arbesman | | |
| 6,579,161 B1 | 6/2003 | Chesley et al. | | |
| 6,913,120 B2 * | 7/2005 | Bosco | .................. | F16D 65/092 188/250 E |
| 7,048,097 B2 | 5/2006 | Arbesman | | |
| 7,097,008 B2 * | 8/2006 | Pham | .................. | F16D 65/0006 188/250 B |
| 7,175,007 B2 * | 2/2007 | Roberts | ................ | F16D 65/092 188/250 B |
| 7,222,701 B2 | 5/2007 | Pham | | |
| 7,568,561 B2 * | 8/2009 | Bosco, Jr. | ............. | F16D 65/092 188/250 B |
| 7,661,515 B2 * | 2/2010 | Maehara | ................ | F16D 65/092 188/250 B |
| 7,731,004 B2 * | 6/2010 | Roehling | ............ | F16D 65/0006 188/250 B |
| 8,974,725 B2 * | 3/2015 | Kulis, Jr. | ................ | B29C 45/03 264/642 |
| 9,259,899 B1 | 2/2016 | Arbesman | | |
| 9,273,741 B1 | 3/2016 | Arbesman et al. | | |
| 9,291,225 B2 | 3/2016 | Arbesman et al. | | |
| 9,321,605 B2 | 4/2016 | Ekola | | |
| 9,360,067 B1 | 6/2016 | Arbesman et al. | | |
| 9,388,872 B1 | 7/2016 | Arbesman et al. | | |
| 9,441,694 B2 * | 9/2016 | Maehara | ............... | F16D 65/092 |
| 9,487,263 B2 | 11/2016 | Iwai et al. | | |
| 10,125,836 B2 * | 11/2018 | Arbesman | ............ | F16D 55/225 |
| 10,612,611 B2 | 4/2020 | Karatas et al. | | |
| 2002/0170789 A1 * | 11/2002 | Poelemans | .......... | F16D 69/0408 188/250 R |
| 2004/0016608 A1 * | 1/2004 | Gutowski | ............. | F16D 65/092 188/73.1 |
| 2004/0099493 A1 | 5/2004 | Himmelsbach et al. | | |
| 2004/0140165 A1 * | 7/2004 | Pham | ..................... | F16D 69/04 188/218 XL |
| 2008/0257665 A1 * | 10/2008 | Roehling | ............ | F16D 65/0971 188/250 G |
| 2009/0031550 A1 * | 2/2009 | Liu | ..................... | F16D 65/0006 29/527.1 |
| 2010/0084227 A1 * | 4/2010 | Lin | ....................... | F16D 65/092 188/73.37 |
| 2010/0170758 A1 * | 7/2010 | Chen | ....................... | B21J 5/068 188/250 G |
| 2012/0031718 A1 | 2/2012 | Arbesman et al. | | |
| 2012/0152667 A1 * | 6/2012 | Bosco, Jr. | ........... | F16D 69/0408 188/251 R |
| 2016/0003317 A1 | 1/2016 | Buxton et al. | | |
| 2016/0091041 A1 * | 3/2016 | Arbesman | ................ | B21J 5/068 188/250 G |
| 2016/0091042 A1 * | 3/2016 | Arbesman | ............ | F16D 65/095 188/251 R |
| 2016/0167341 A1 | 6/2016 | Arbesman et al. | | |
| 2016/0230792 A1 | 8/2016 | Arbesman et al. | | |
| 2016/0281811 A1 | 9/2016 | Pizzio et al. | | |
| 2016/0363183 A1 | 12/2016 | Arbesman et al. | | |
| 2017/0219033 A1 | 8/2017 | Arbesman et al. | | |

FOREIGN PATENT DOCUMENTS

| | | |
|---|---|---|
| CN | 105658983 A | 6/2016 |
| DE | 102015116778 A1 | 4/2017 |
| GB | 2012647 A | 8/1979 |
| GB | 2123908 A | 2/1984 |
| JP | S5686244 A | 7/1981 |
| JP | S61140632 A | 6/1986 |
| JP | H0663944 A | 3/1994 |
| JP | H11153165 A | 6/1999 |
| JP | H11210792 A | 8/1999 |
| JP | 2002364685 A | 12/2002 |
| JP | 2009174610 A | 8/2009 |
| JP | 2013053687 A | 3/2013 |
| KR | 1998004958 U | 10/1998 |
| KR | 20040071875 A | 8/2004 |

OTHER PUBLICATIONS

International Search Report corresponding to International application No. PCT/US2018/039256, dated Oct. 26, 2018, 3 pages.
International Preliminary Report on Patentability issued for the corresponding to International application No. PCT/US2019/026056, dated Oct. 15, 2020.
International Search Report and Written Opinion issued for the corresponding to International application No. PCT/US2019/026056, dated Jul. 26, 2019.

(56) References Cited

OTHER PUBLICATIONS

Office Action issued by the China National Intellectual Property Administration for application CN 201980023123.8 dated Oct. 8, 2022; 9 pages.

* cited by examiner

FIG. 18

BRAKE PAD BACKING PLATE

CROSS-REFERENCE TO RELATED APPLICATION

This application claims the benefit of U.S. Provisional Application Ser. No. 62/653,679 filed on Apr. 6, 2018, the entire contents of which are hereby incorporated by reference.

TECHNICAL FIELD

This invention generally relates to automotive brakes and, in particular, to backing plates for automotive brake pads.

BACKGROUND

Brake pads are used in a variety of vehicles of varying size, including motorcycles, automobiles, and trucks, and generally include a backing plate and a friction pad attached to the backing plate. The backing plate configuration is typically dictated by the caliper design, so it may be desirable to help promote attachment of the backing plate to the friction pad without drastically altering the overall configuration of the backing plate.

SUMMARY

According to one embodiment, there is provided a backing plate and/or a brake pad, the backing plate comprising: a reinforcement plate having an outboard surface, an inboard surface, and a mold hole; and a retention plate having an outboard surface, an inboard surface, and a locking projection that cooperates with the mold hole of the reinforcement plate to mechanically lock the retention plate to the reinforcement plate so that the inboard surface of the reinforcement plate faces the outboard surface of the retention plate.

According to various embodiments, the backing plate may further include any one of the following features or any technically-feasible combination of these features:
  the locking projection includes a flanged edge which rests against an outboard facing surface of the reinforcement plate;
  the outboard facing surface is a counterbore step in the mold hole;
  the flanged edge rests against a radially extending wall of the counterbore step;
  the outboard facing surface is the outboard surface of the reinforcement plate;
  the locking projection is a hollow boss comprising an annular interface wall having an outer surface and an inner surface;
  the hollow boss is integral with the retention plate such that the inboard surface of the retention plate is continuous with the inner surface of the annular interface wall of the locking projection and the outboard surface of the retention plate is continuous with the outer surface of the annular interface wall of the locking projection;
  a dampening layer between the reinforcement plate and the retention plate;
  an annular portion of the dampening layer is located adjacent to the outer surface of the annular interface wall of the locking projection;
  the retention plate is made of aluminum or an aluminum-based alloy, and the reinforcement plate is made of steel or cast iron;
  the retention plate includes a plurality of retention members configured to interlock a friction pad;
  the plurality of retention members includes a plurality of angled protrusions or a plurality of hooks; and/or
  the plurality of retention members includes a plurality of hollow extensions, wherein each hollow extension of the plurality of hollow extensions has a first diameter at the outboard surface of the retention plate and a second diameter at the inboard surface of the retention plate, wherein the first diameter is greater than the second diameter.

According to another embodiment, there is provided a backing plate and/or a brake pad, the backing plate comprising: a reinforcement plate having an outboard facing surface and an inboard surface; and a retention plate having an outboard surface, an inboard surface, and a locking projection that mechanically locks the retention plate to the reinforcement plate so that the inboard surface of the reinforcement plate faces the outboard surface of the retention plate, wherein the locking projection includes a flanged edge which rests against the outboard facing surface of the retention plate.

According to various embodiments, this backing plate may further include any one of the following features or any technically-feasible combination of these features:
  the outboard facing surface is a counterbore step in a mold hole of the reinforcement plate; and/or
  the flanged edge is remote from an outboard surface of the reinforcement plate.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION

The backing plate embodiments disclosed herein may be used in various brake pad designs and in various vehicle applications to help improve attachment of the friction pad. The backing plate embodiments are multi-layered which can allow for the use of different materials in configurations to promote shear retention. For example, the use of multiple layers can allow each layer to expand and contract independently when exposed to heat and pressure during manufacturing and/or operation, as opposed to a rigid attachment between a typical steel backing plate and friction pad that could result in bending. Additionally, the use of multiple layers can allow a standard sized backing plate to be adapted without changing the overall configuration of a backing plate designed for a particular caliper. Further, additional dampening layers or the like may be added to improve noise vibration and harshness (NVH) performance of the brake pad.

Figure 1:
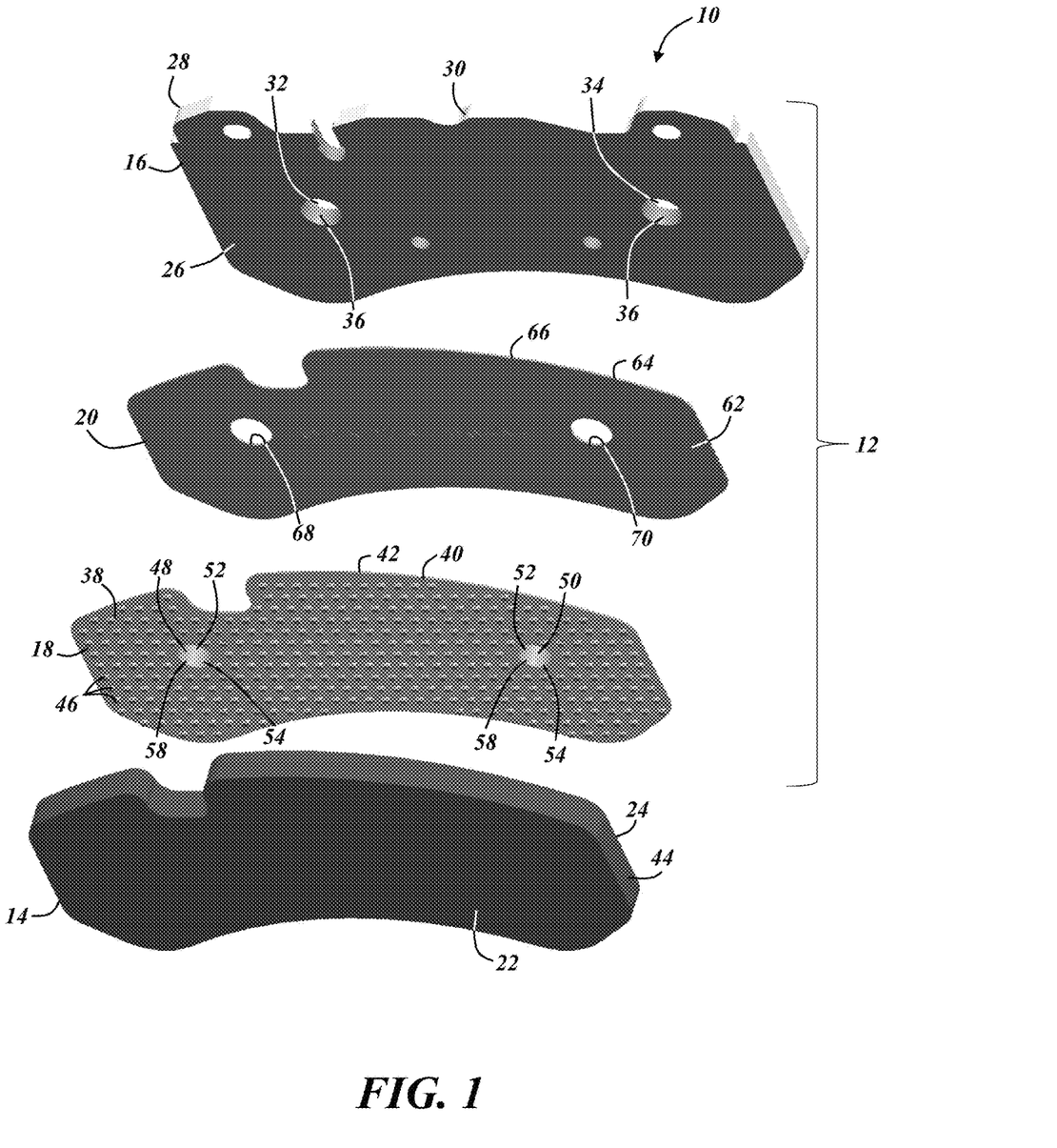
FIG. 1 is an exploded view of a brake pad having a backing plate according to one embodiment.
Figure 2:
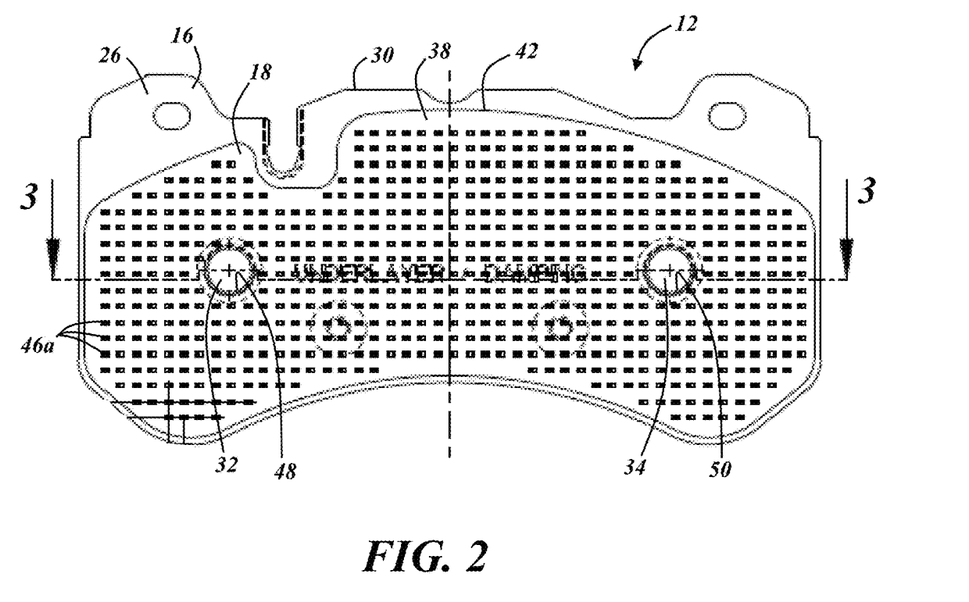
FIG. 2 shows the backing plate of FIG. 1.
Figure 3:
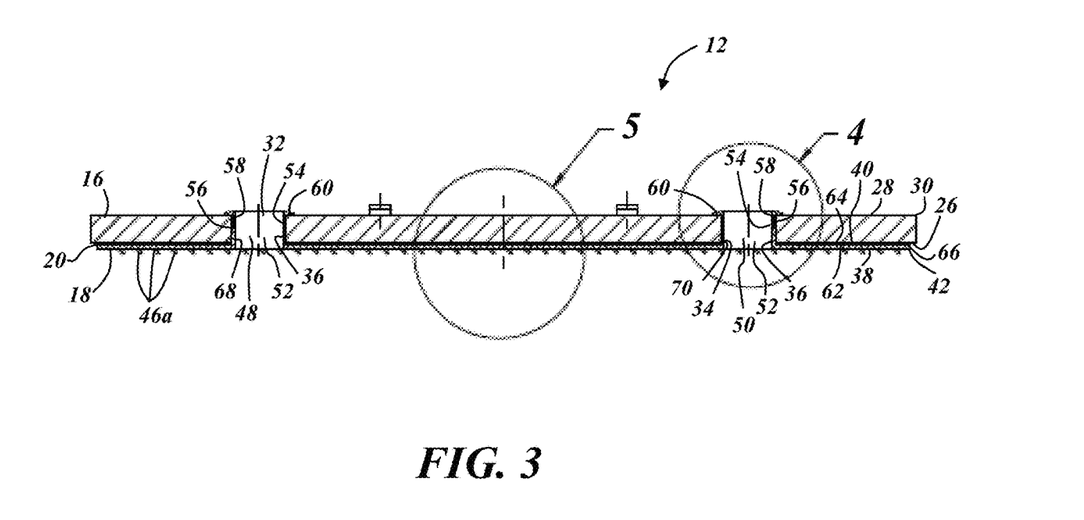
FIG. 3 is a cross-section of the backing plate of FIGS. 1 and 2 taken along line 3-3 in FIG. 2.

FIG. 1 is an exploded view of a brake pad 10. The brake pad 10 includes a backing plate 12 and a friction pad 14. The illustrated backing plate 12 configuration and friction pad 14 configuration are just an example, as other geometries, features, etc., may be possible depending on factors such as the caliper design. The backing plate 12 in the illustrated embodiment includes a reinforcement plate 16 and a retention plate 18 that is situated between the reinforcement plate 16 and the friction pad 14. As will be detailed further below, the backing plate 12 includes a number of features to help promote adhesion or attachment of the various components of the brake pad 10 to thereby improve the life and performance of the brake pad. Further, other features such as a dampening layer 20 may also be included to help provide performance and adhesion benefits.

The friction pad 14 interacts with a braking surface such as a rotor (not shown) to inhibit rotational motion and stop the vehicle. A rotor is used as an example herein to positionally describe one or more features of the brake pad 10. Accordingly, directional terms such as inboard and outboard may be used to describe whether a component faces toward a rotor (e.g., inboard) or away from a rotor (e.g., outboard) when the brake pad 10 is installed. The friction pad 14 includes an inboard-facing friction surface 22 and an outboard-facing attachment surface 24. The friction surface 22 may include other features that are not illustrated, such as chamfers, slots, curved edges, wear sensors or indicators, etc. The attachment surface 24 directly opposes the retention plate 18 of the backing plate 12, although other layers such as an adhesive layer or the like may be included. The friction pad 14 may be made from any operable material, such as a non-asbestos organic (NAO) material, a ceramic material, or a semi-metallic material (e.g., about 30-65 wt % metal).

Typically, the friction pad 14 is directly (or indirectly via an adhesive layer) bonded to a steel backing plate or reinforcement plate 16. However, in accordance with the presently described brake pad 10, one or more other layers may be included between the reinforcement plate 16 and the friction pad 14. The reinforcement plate 16 is typically a steel plate, the configuration of which is dictated by the needs of the braking system or caliper design. Accordingly, other features, shapes, materials, etc. besides those illustrated and described may be employed for the reinforcement plate 16, such as additional caliper attachment projections, eye holes, etc., to cite a few examples. The reinforcement plate 16 has an inboard surface 26, an outboard surface 28, and an outer perimeter 30. In some embodiments, the thickness $T_{R1}$ of the reinforcement plate 16 between the inboard surface 26 and the outboard surface 28 may be decreased in view of the multi-layer design, thereby decreasing weight of the brake pad 10—an industrial advantage. In the illustrated embodiment, the thickness $T_{R1}$ of the reinforcement plate 16 between the inboard surface 26 and the outboard surface 28 may be about 5-6 mm, inclusive.

The reinforcement plate 16 may include one or more mold holes 32, 34. While two mold holes 32, 34 are shown in the illustrated embodiments, more or less may be included depending on the desired implementation. During manufacturing of the brake pad 10, the friction pad 14 is pressed such that at least some of the friction pad material is pushed though the mold holes 32, 34 to help lock the friction pad and the reinforcement plate 16. Each mold hole 32, 34 includes a periphery wall 36 that extends between the inboard surface 26 and the outboard surface 28 of the reinforcement plate 16.

Figure 4:
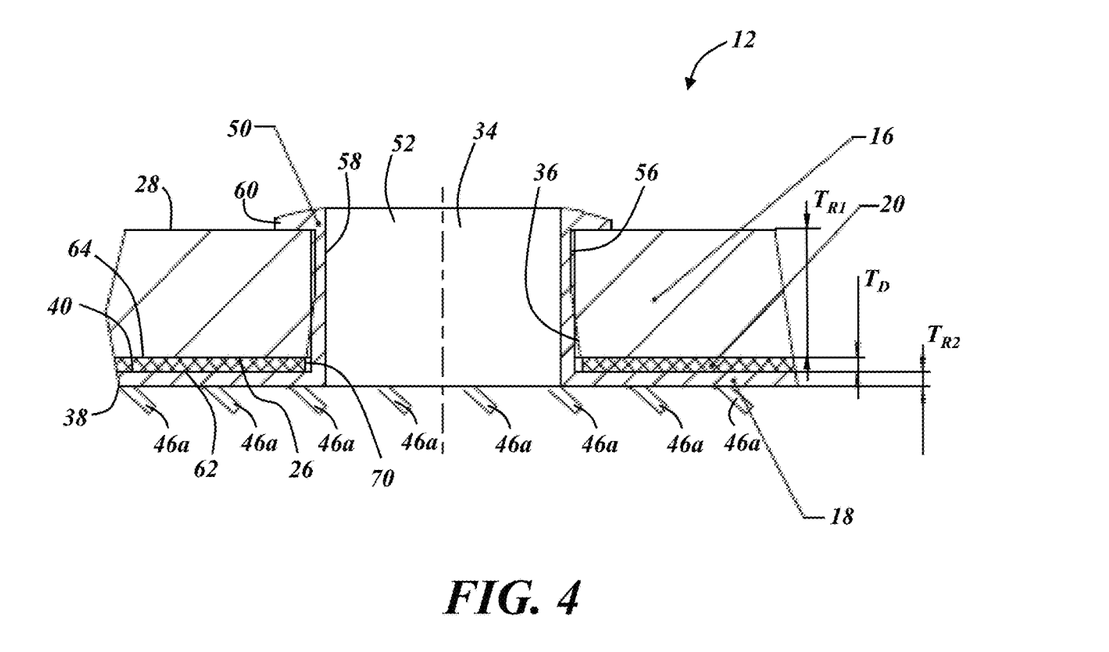
FIG. 4 is an enlarged view of the locking projection of the backing plate of FIGS. 1-3.

Embodiments of the brake pad may include a retention plate 18 that is located between the friction pad 14 and the reinforcement plate 16. The retention plate 18 includes an inboard surface 38, an outboard surface 40, and an outer perimeter 42. In the illustrated embodiments, the outer perimeter 42 of the retention plate 18 is smaller than the outer perimeter 30 of the reinforcement plate 16. The outer perimeter 42 of the retention plate 18 may be equal to an outer perimeter 46 of the friction pad 14. In a preferred embodiment, the retention plate 18 is made from a lighter weight material such as aluminum or an aluminum alloy, although other materials are certainly possible. In some embodiments, the retention plate 18 need not be made from a lighter material such as aluminum, as it may be made from steel or another operable material. As indicated in FIG. 4, the thickness $T_{R2}$ of the retention plate 18 is typically less than the thickness $T_{R1}$ of the reinforcement plate 16. In the illustrated embodiments, the thickness $T_{R2}$ of the retention plate 18 between the inboard surface 38 and the outboard surface 40 is about 0.8-2 mm, inclusive, and in one preferred embodiment is about 1.5 mm. Accordingly, in this preferred embodiment, the thickness $T_{R2}$ of the retention plate 18 is about 25-30% of the thickness $T_{R1}$ of the reinforcement plate 16. The retention plate 18 includes various features to help promote attachment of the other components of the brake pad 10, such features including optional retention members 46 (only a few are numbered for clarity purposes) and/or one or more locking projections 48, 50. Additionally, it is also possible to use an adhesive layer between the reinforcement plate 16 and the retention plate 18. If a dampening layer 20 is used, the adhesive layer may be present between the dampening layer 20 and the reinforcement plate 16 and/or between the dampening layer 20 and the retention plate 18.

In some embodiments, retention members 46 may be included to provide an additional mechanical interlock of the friction pad 14. The retention members 46 may be provided on the inboard surface 38 of the retention plate 16 to embed into or otherwise lock the attachment surface 24 of the friction pad 14. Adhesive or other laminate layers may be provided between the retention plate 16 and the attachment surface 24 of the friction pad 14 to help bonding. Also, in some embodiments, the retention plate 16 may not include separate retention members 46. For example, the pressure and temperature of the molding process may be sufficient to bond the friction pad 14 to the backing plate 12 without the use of retention members 46.

FIGS. 2-17 more clearly illustrate examples of various configurations that may be used for the retention members 46. FIGS. 2-5 illustrate a backing plate 12 including retention members 46*a* in the form of angled protrusions. FIGS. 6-9 illustrate a backing plate 12 including retention members 46*b* in the form of hooks. FIGS. 10-13 illustrate a backing plate 12 including retention members 46*c* in the form of small diameter hollow extensions. FIGS. 14-17 illustrate a backing plate 12 including retention members 46d in the form of large diameter hollow extensions. Other shapes and configurations for the retention members 46 are certainly possible. The retention members 46 may be formed from the material of the retention plate 18 itself. For example, retention members 46*a* or 46*b* may be scraped into or otherwise integrally formed into the inboard surface 38 of the retention plate 18. In another example, retention members 46*c* or 46*d* may be pierced or punched though the body of the retention plate 18. Alternatively, the retention members 46 may be welded on or otherwise added to the inboard surface 38 of the retention plate 18. For example, rivet-like projections or the like may be welded to or deposited on the inboard surface 38 of the retention plate 18. The retention members 46 may increase the amount of interlockable surface area available for bonding the friction pad 14. Preferably, the retention members 46 span the extent of the inboard surface 38 of the retention plate 18, but it is possible to have more or less retention members 46 than what is shown in the illustrated embodiments.

Figure 5:
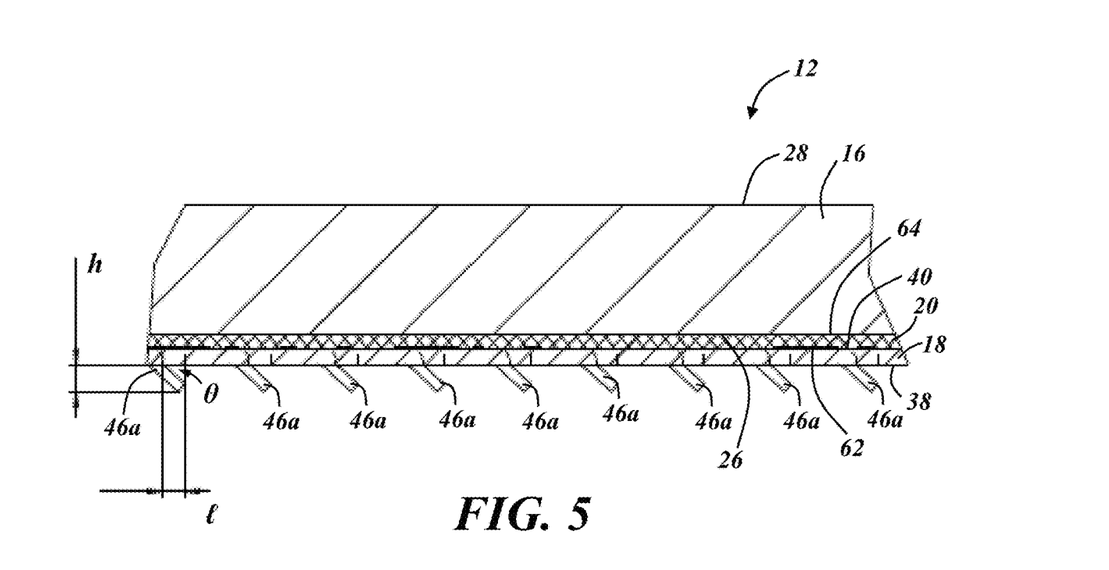
FIG. 5 is an enlarged view of the retention members of the backing plate of FIGS. 1-4.
Figure 6:
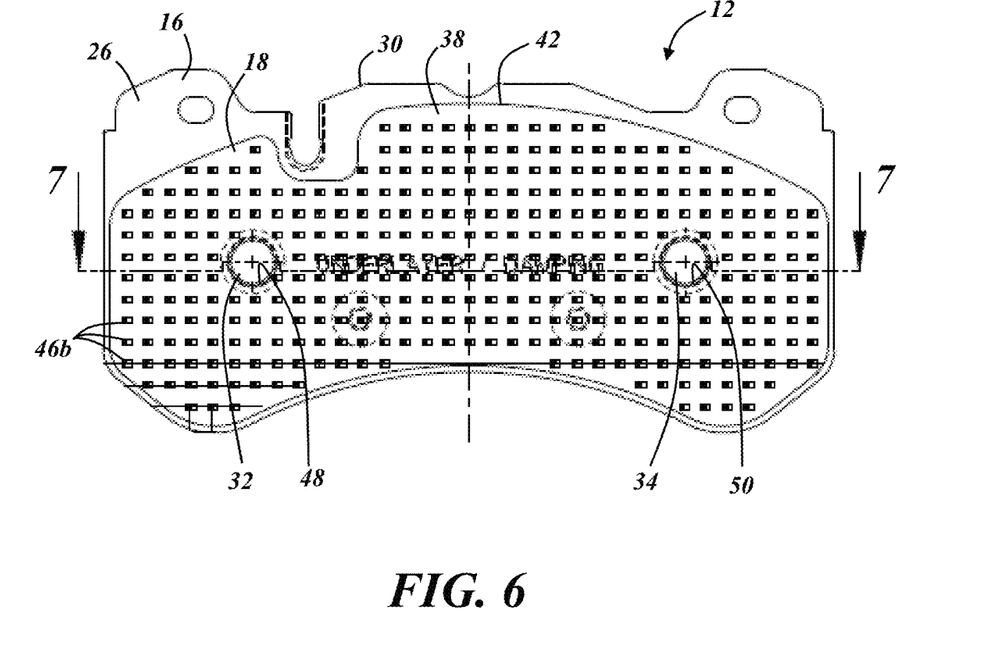
FIG. 6 illustrates a backing plate in accordance with another embodiment.
Figure 7:
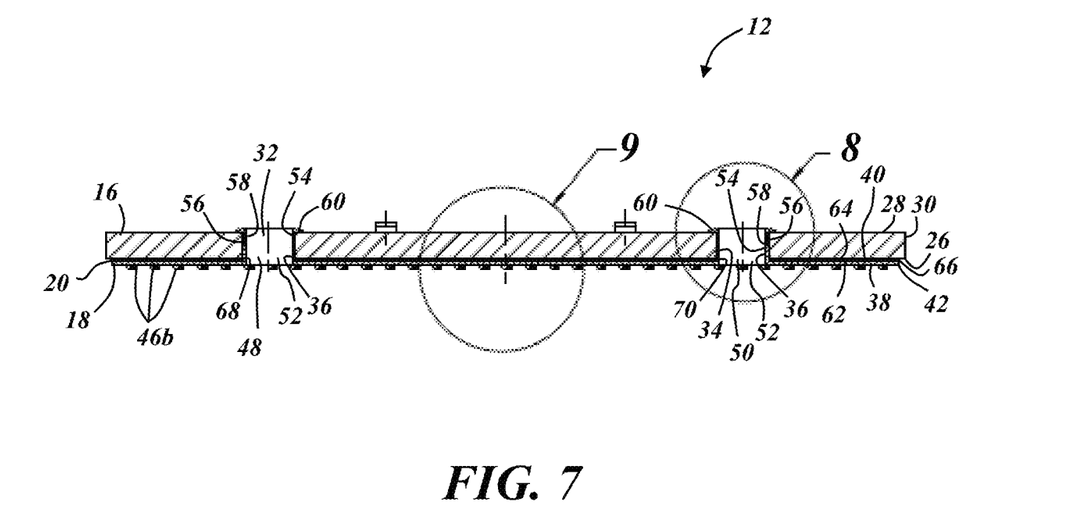
FIG. 7 is a cross-section of the backing plate of FIG. 6 taken along line 7-7 in FIG. 6.
Figure 8:
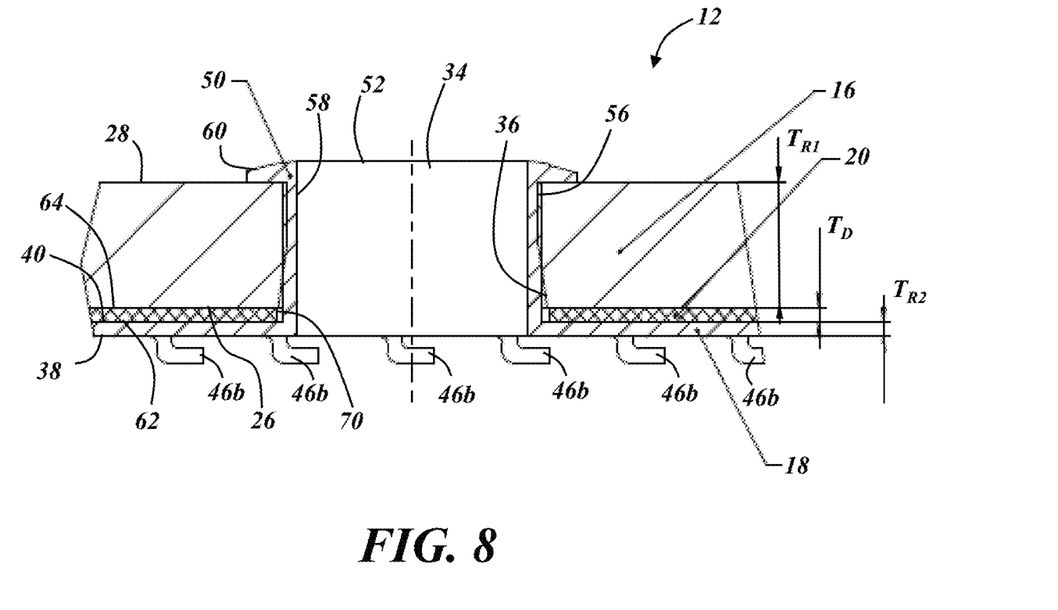
FIG. 8 is an enlarged view of the locking projection of the backing plate of FIGS. 6 and 7.
Figure 9:
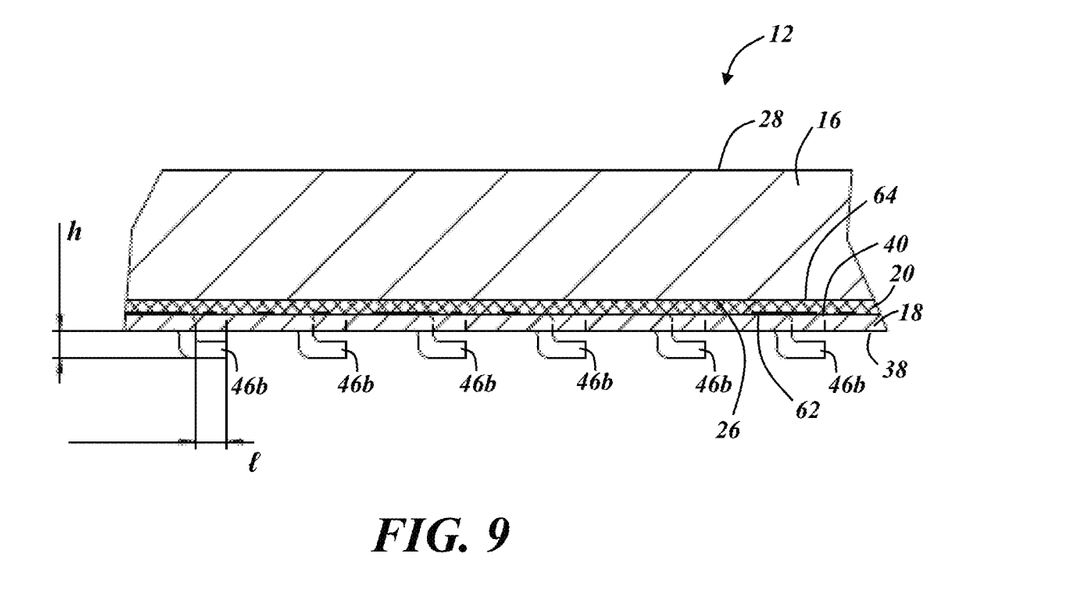
FIG. 9 is an enlarged view of the retention members of the backing plate of FIGS. 6-8.
Figure 10:
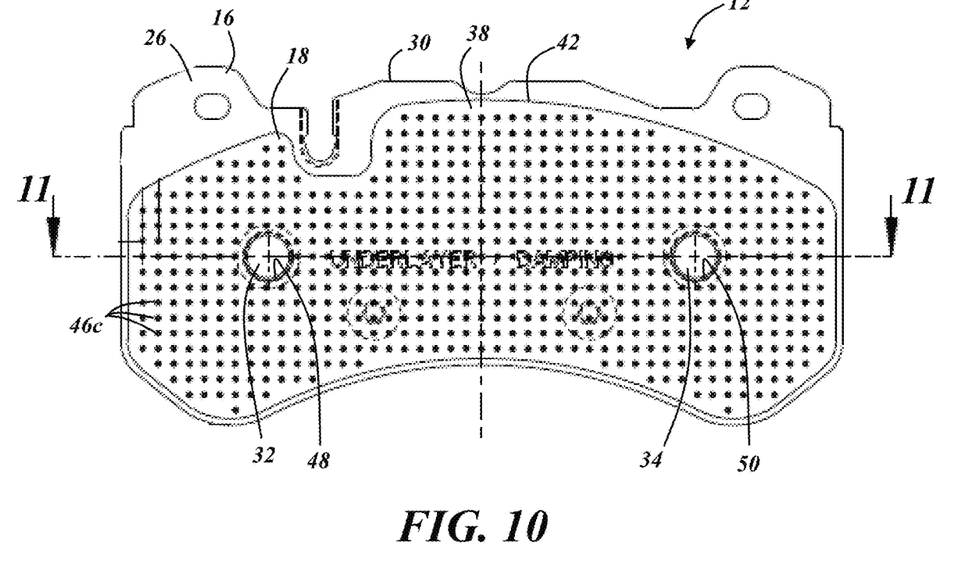
FIG. 10 illustrates a backing plate in accordance with another embodiment.
Figure 11:
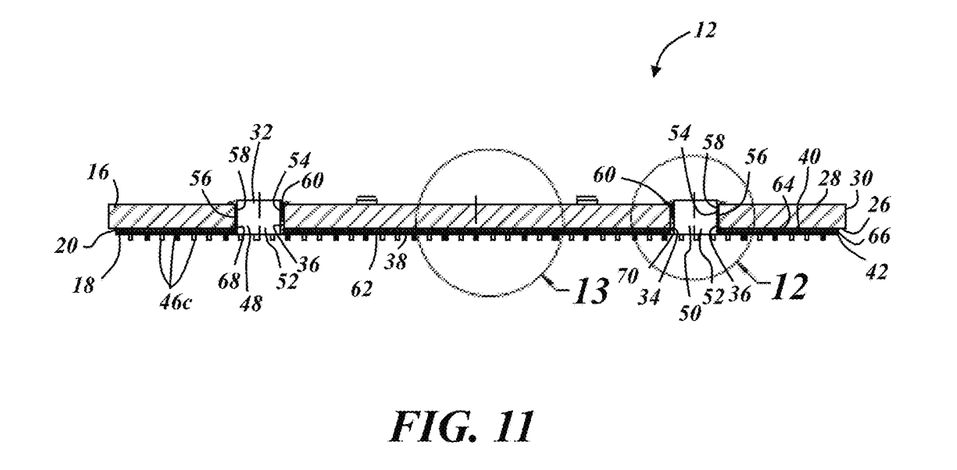
FIG. 11 is a cross-section of the backing plate of FIG. 10 taken along line 11-11 in FIG. 10.
Figure 12:
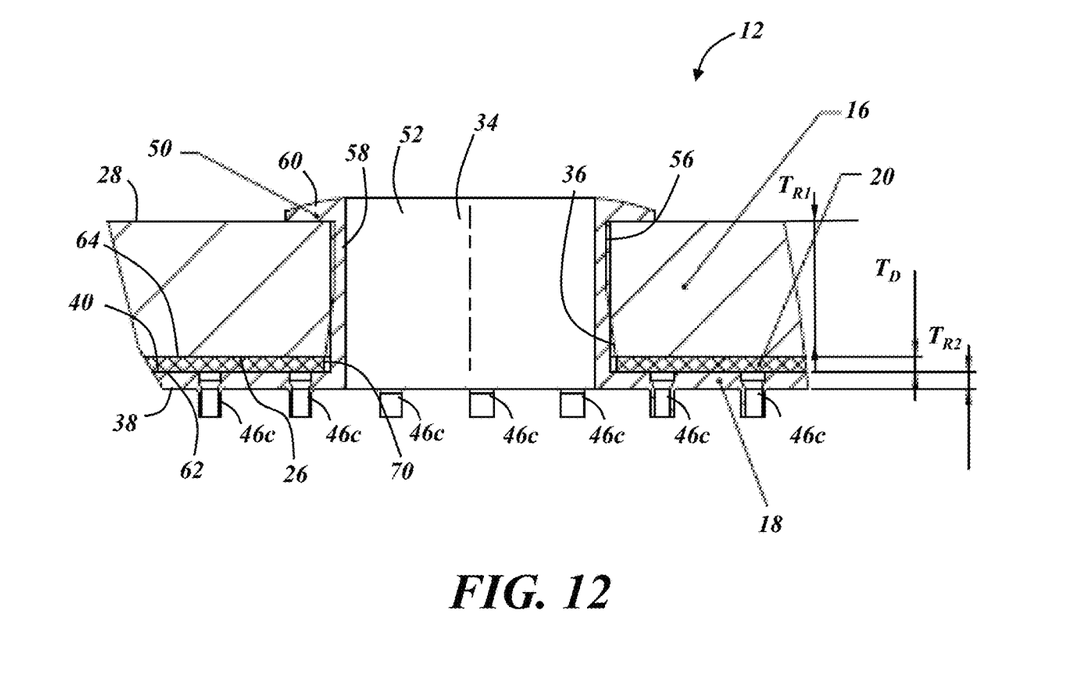
FIG. 12 is an enlarged view of the locking projection of the backing plate of FIGS. 10 and 11.
Figure 13:
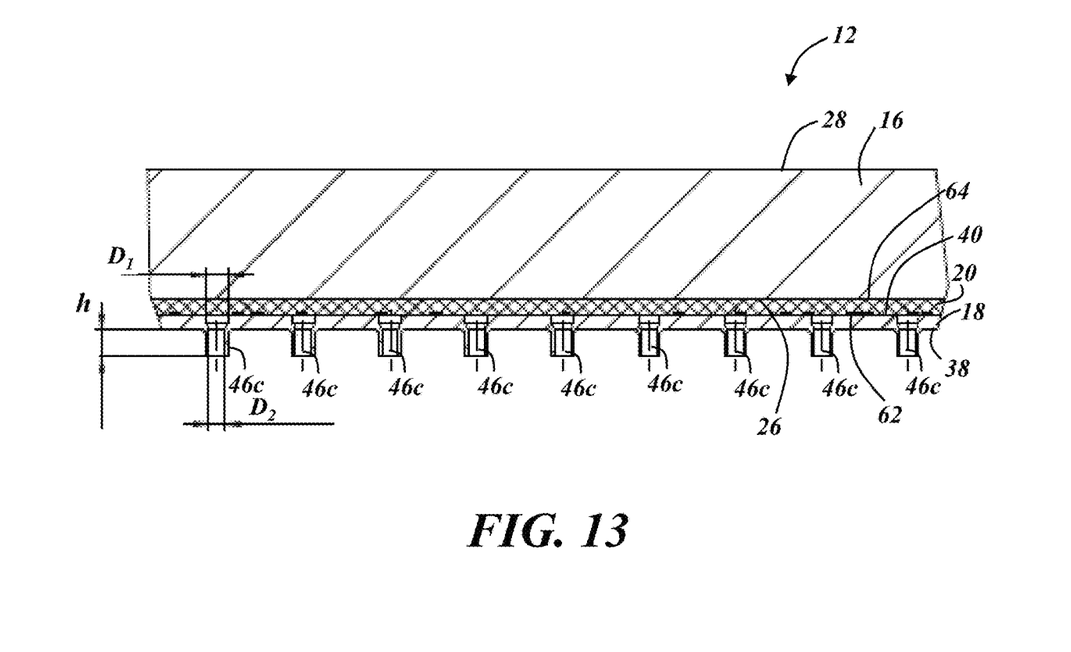
FIG. 13 is an enlarged view of the retention members of the backing plate of FIGS. 10-12.
Figure 14:
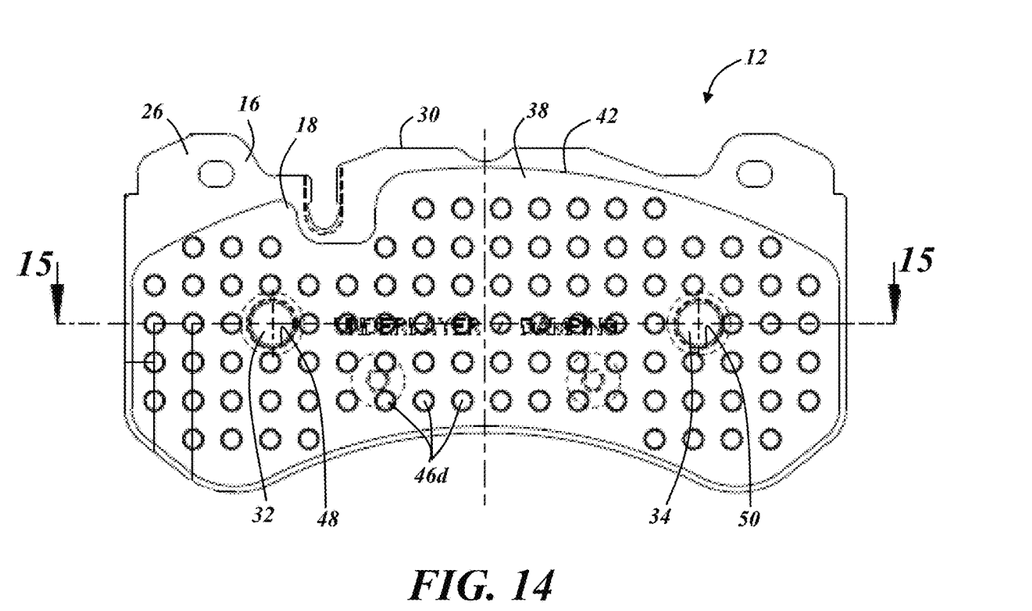
FIG. 14 illustrates a backing plate in accordance with another embodiment.
Figure 15:
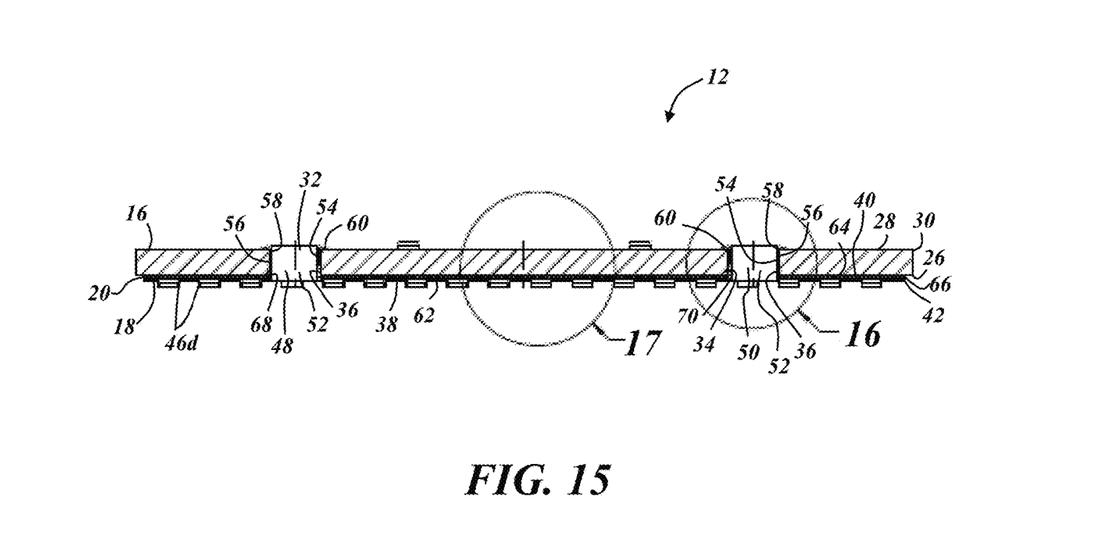
FIG. 15 is a cross-section of the backing plate of FIG. 14 taken along line 15-15 in FIG. 14.
Figure 16:
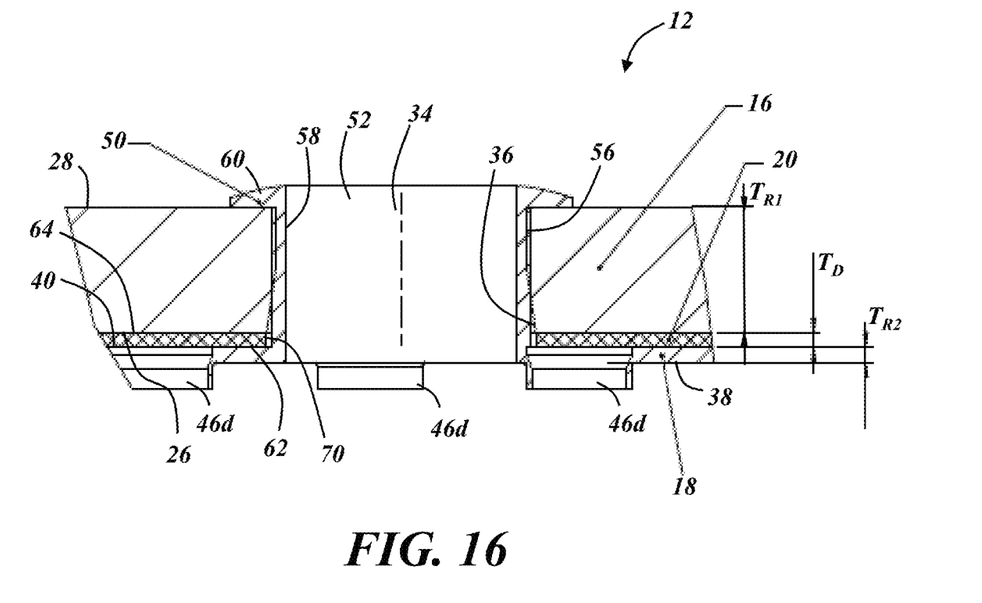
FIG. 16 is an enlarged view of the locking projection of the backing plate of FIGS. 14 and 15.
Figure 17:
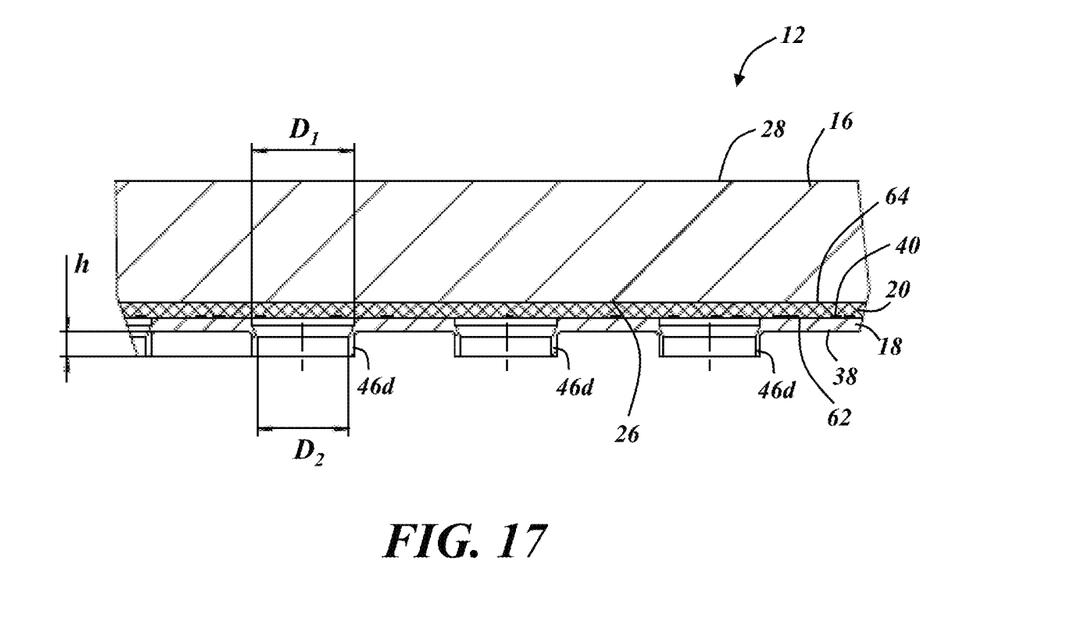
FIG. 17 is an enlarged view of the retention members of the backing plate of FIGS. 14-16.

The retention members 46*a* illustrated in FIGS. 2-5 are angled protrusions that extend from the inboard surface 38 of the retention plate 18. With particular reference to FIG. 5, the retention members 46*a* have a height h of about 0.75-1.75 mm, inclusive, and more preferably, about 1.25 mm. The retention members 46*a* have a length l of material that is scraped away or extending from the inboard surface 38 of about 0.9-1.1 mm, inclusive, and more preferably, about 1.0 mm. They extend at an angle θ of about 40-60°, and more preferably about 50°. The retention members 46*a* having the illustrated and described configuration may be relatively easy to manufacture.

The retention members 46*b* illustrated in FIGS. 6-9 have a hook shape of about 90°, a height h of about 0.75-1.75 mm, inclusive, or more preferably, about 1.25 mm. The retention members 46*b* have a length l of material that is scraped away or available to interlock the friction pad 14 of about 1-2 mm, inclusive, and more preferably, about 1.5 mm. The configuration of retention members 46*b* may provide a greater undercut area for friction pad 14 adhesion.

The retention members 46*c* illustrated in FIGS. 10-13 include a small diameter hollow extension. The retention members 46*c* have a height h of about 0.75-1.75 mm, inclusive, or more preferably, about 1.25 mm. The first diameter D1 of the small diameter hollow extension at the outboard surface 40 of the retention plate 18 is about 1 mm and the second diameter D2 of the main body portion of the small diameter hollow extension is about 0.75 mm. This variation between D1 and D2 can provide undercut areas for locking the friction pad 14, and the smaller diameters D1 and D2 can allow for the inclusion of more retention members 46*c* on the inboard surface 38 of the retention plate 18.

The retention members 46*d* illustrated in FIGS. 14-17 include a large diameter hollow extension. The retention members 46*d* have a height h of about 0.75-1.75 mm, inclusive, or more preferably, about 1.25 mm. The first diameter D1 of the large diameter hollow extension at the outboard surface 40 of the retention plate 18 is about 4.5-5.5 mm, inclusive, or more preferably, about 5 mm. The second diameter D2 of the main body portion of the large diameter hollow extension is about 4-5 mm, inclusive, or more preferably, about 4.5 mm. The retention members 46*d* may provide more undercut surface area at each retention member for locking the friction pad 14.

While the retention members 46 may be used to help encourage a mechanical interlock of the retention plate 18 to the friction pad 14, features such as the locking projections 48, 50 may be used to promote locking of the retention plate 18 to the reinforcement plate 16. Cross-sectional views of one embodiment of a locking projection 48, 50 are shown in FIGS. 3, 4, 7, 8, 11, 12, 15, and 16. As shown, the locking projections 48, 50 cooperate with the mold holes 32, 34 of the reinforcement plate 16 so that the inboard surface 26 of the reinforcement plate 16 faces the outboard surface 40 of the retention plate 18. As will be detailed further below, the dampening layer 20 may be used between the inboard surface 26 of the reinforcement plate 16 and the outboard surface 40 of the retention plate 18. However, it is possible to have an embodiment without the dampening layer 20 such that inboard surface 26 of the reinforcement plate 16 directly touches or interfaces with the outboard surface 40 of the retention plate 18.

In the illustrated embodiments, the locking projections 48, 50 include a hollow boss 52. The hollow boss 52 extends into the mold hole 32, 34 and includes an interface wall 54 having an outer surface 56 and an inner surface 58. Other embodiments and configurations for the locking projections 48, 50 are certainly possible. To cite one example, the locking projection could comprise a number of segmented extensions that extend into the mold hole without forming a continuous, annular wall as shown. In the illustrated embodiment, the interface wall 54 generally follows or tracks the shape of the mold hole 32, 34, and with a cylindrical embodiment as shown, has a smaller diameter than the periphery wall 36 of the mold hole. The outer surface 56 of the interface wall 54 is located adjacent to, and in this embodiment, directly contacts the periphery wall 36. The inner surface 58 of the interface wall 54, in a manufactured brake pad 10, is located adjacent to, and in this embodiment, directly contacts the friction pad 14. Furthermore, in the illustrated embodiments, the hollow boss 52 is integral with the retention plate 18 such that the inboard surface 38 of the retention plate is continuous or unitary with the inner surface 58 of the interface wall 54 of the locking projection 48, 50. Similarly, the outboard surface 40 of the retention plate 18 is continuous or unitary with the outer surface 56 of the interface wall 54 of the locking projection 48, 50. This may be done by forming the retention plate 18 and the locking projections 48, 50 from a single piece of metal, such as by draw-forming or otherwise metal working a single piece of stamped metal to form the projections, or by molding or by machining from a larger metal piece.

To help further lock the reinforcement plate 16 to the retention plate 18, the locking projections 48, 50 can include a flanged edge 60 which rests against or makes direct contact with the outboard surface 28 of the reinforcement plate 16. The flanged edge 60 helps impart a riveting effect to lock the reinforcement plate 16 to the retention plate 18. During manufacture of the backing plate 12, the hollow boss 52 may be inserted into the mold hole 32, 34. The protruding edge of the hollow boss 52 can be hammered or otherwise flattened to form the flanged edge 60. Given this manufacturing method, it may be desirable to use a softer metal such as aluminum or an aluminum alloy to for the retention plate 18 and a stronger metal such as steel or cast iron for the reinforcement plate 16.

Figure 18:
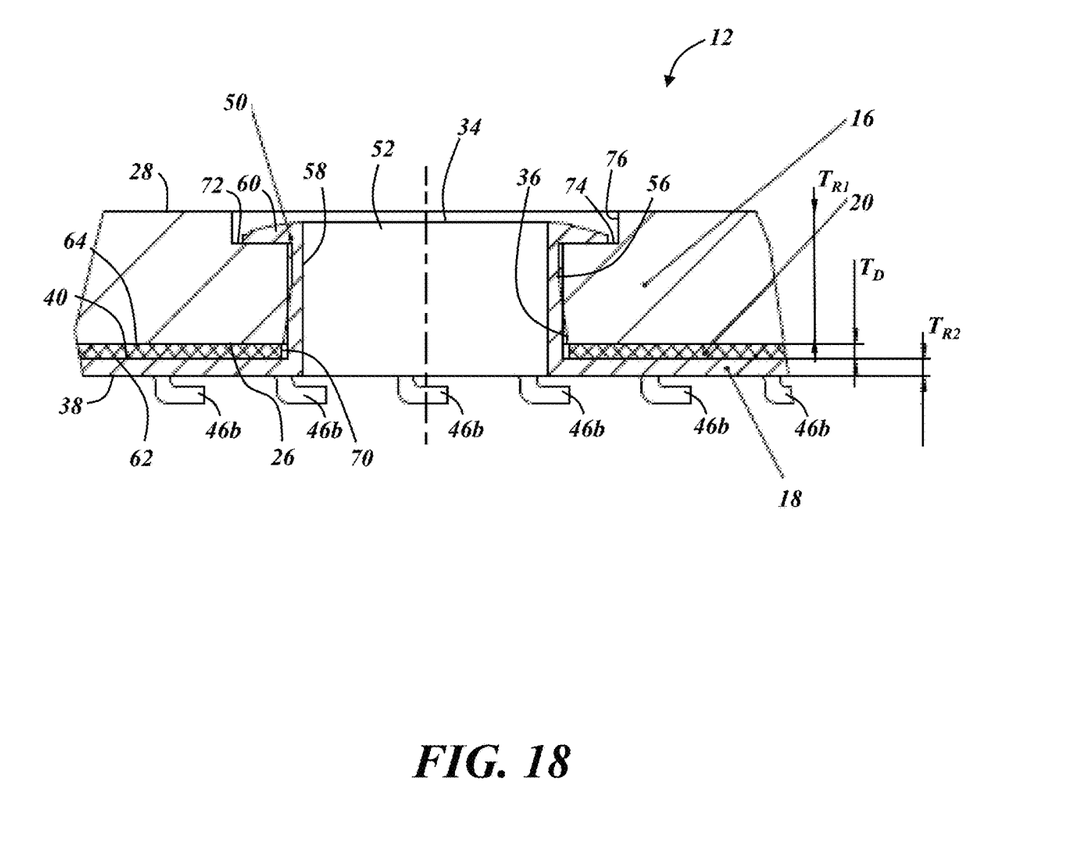
FIG. 18 is an enlarged view of the locking projection of a backing plate in accordance with another embodiment.

FIG. 18 illustrates another embodiment of the backing plate 12. In this embodiment, each mold hole 32 of the reinforcement plate 16 includes a counterbore step 72. The counterbore step 72 is an outboard facing surface, like the outboard surface 28 of the reinforcement plate 16. The mold hole 32 has a periphery wall 36, as with the other embodiments, but also includes a radially extending wall 74 that leads to a diametrically expanded portion 76 adjacent the outboard surface 28. The flanged edge 60 of the locking projection 48 rests upon the radially extending wall 74 of the counterbore step 72. This embodiment can be advantageous, as it can result in less exposure of the retention plate 18 to the caliper and/or variation on the outboard surface 28 of the reinforcement plate 16, thereby improving performance.

To alter one or more performance characteristics, features such as the dampening layer 20 may be included. While rubber shims and the like are typically located on outboard facing surfaces of backing plates, such as the outboard surface 28 of the reinforcement plate 16, the multi-layer backing plate 12 allows for a dampening layer 20 to be included between the inboard surface 26 of the reinforcement plate 16 and the outboard surface 40 of the retention plate 18. The dampening layer 20 may alter the frequency response of the brake pad 10 to reduce brake squeal, creep groan, and/or grunt. It is possible to include dampening layer 20 in addition to a shim located on the outboard surface 28 of the reinforcement plate 16 to further abate noise and vibration. The dampening layer 20 may be made from any operable material such as nitrile butadiene rubber (NBR) or silicone rubber, to cite two examples.

Returning to FIG. 1, the dampening layer 20 may include an inboard surface 62, an outboard surface 64, and an outer perimeter 66. The inboard surface 62 of the dampening layer 20 is adjacent to and may directly contact the outboard surface 40 of the retention plate 18. The outboard surface 64 of the dampening layer 20 is adjacent to and may directly contact the inboard surface 26 of the reinforcement plate 16. The outer perimeter 66 of the dampening layer 20 may generally coincide with the outer perimeter 42 of the retention plate 18. The dampening layer 20 also includes annular portions 68, 70 that accommodate the locking projections 48, 50. In the illustrated embodiments, the annular portions 68, 70 of the dampening layer 20 are located adjacent to each outer surface 56 of each interface wall 54 of the locking projections 48, 50. In the illustrated embodiments, the thickness TD of the dampening layer 20 is about 0.4-1 mm, inclusive.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A backing plate for a brake pad, comprising:
   a reinforcement plate having an outboard surface, an inboard surface, and a mold hole;
   a retention plate having an outboard surface, an inboard surface, and a locking projection that cooperates with the mold hole of the reinforcement plate to mechanically lock the retention plate to the reinforcement plate so that the inboard surface of the reinforcement plate faces the outboard surface of the retention plate, wherein the mold hole is configured to retain at least a portion of friction pad material from a friction pad, wherein the locking projection is a hollow boss comprising an annular interface wall having an outer surface and an inner surface; and
   a dampening layer between the reinforcement plate and the retention plate, wherein an annular portion of the dampening layer is located adjacent to the outer surface of the annular interface wall of the locking projection.

2. The backing plate of claim 1, wherein the locking projection includes a flanged edge which rests against an outboard facing surface of the reinforcement plate.

3. The backing plate of claim 2, wherein the outboard facing surface is a counterbore step in the mold hole.

4. The backing plate of claim 3, wherein the flanged edge rests against a radially extending wall of the counterbore step.

5. The backing plate of claim 2, wherein the outboard facing surface is the outboard surface of the reinforcement plate.

6. The backing plate of claim 1, wherein the hollow boss is integral with the retention plate such that the inboard surface of the retention plate is continuous with the inner surface of the annular interface wall of the locking projection and the outboard surface of the retention plate is continuous with the outer surface of the annular interface wall of the locking projection.

7. The backing plate of claim 1, wherein the retention plate is made of aluminum or an aluminum-based alloy, and the reinforcement plate is made of steel or cast iron.

8. A brake pad, comprising:
   a backing plate and a friction pad, the backing plate comprising:
      a reinforcement plate having an outboard surface, an inboard surface, and a mold hole; and
      a retention plate having an outboard surface, an inboard surface, and a locking projection that cooperates with the reinforcement plate to mechanically lock the retention plate to the reinforcement plate so that the inboard surface of the reinforcement plate faces the outboard surface of the retention plate, wherein the retention plate includes a plurality of retention members configured to interlock a the friction pad, wherein the plurality of retention members project from the inboard surface of the retention plate to interlock the friction pad, and wherein the plurality of retention members is located on the inboard surface of the retention plate separate from the locking projection and the mold hole; and wherein the friction pad is comprised of a friction material and the friction pad has a friction surface and an attachment surface, wherein the attachment surface is attached to the inboard surface of the retention plate, wherein the friction material at the attachment surface extends at least partially into the mold hole, and wherein the retention plate is located between the friction pad and the reinforcement plate such that the inboard surface of the retention plate faces against the attachment surface of the friction pad and the outboard surface of the retention plate faces against the inboard surface of the reinforcement plate.

9. The brake pad of claim 8, wherein the plurality of retention members includes a plurality of angled protrusions or a plurality of hooks.

10. The brake pad of claim 8, wherein the plurality of retention members includes a plurality of hollow extensions, wherein each hollow extension of the plurality of hollow extensions has a first diameter at the outboard surface of the retention plate and a second diameter at the inboard surface of the retention plate, wherein the first diameter is greater than the second diameter.

11. A brake pad, comprising:
a backing plate and a friction pad, the backing plate comprising:
a reinforcement plate having an outboard facing surface, an inboard surface, and a mold hole; and
a retention plate having an outboard surface, an inboard surface, and a locking projection that cooperates with the mold hole of the reinforcement plate to mechanically lock the retention plate to the reinforcement plate so that the inboard surface of the reinforcement plate faces the outboard surface of the retention plate, wherein the locking projection includes a flanged edge which rests against the outboard facing surface of the reinforcement plate, wherein the mold hole is configured to retain at least a portion of friction pad material from a friction pad, and wherein the reinforcement plate is thicker than the retention plate; and wherein the friction pad is comprised of a friction material and the friction pad has a friction surface and an attachment surface, wherein the attachment surface is attached to the inboard surface of the retention plate, wherein the friction material at the attachment surface extends at least partially into the mold hole, and wherein the retention plate is located between the friction pad and the reinforcement plate such that the inboard surface of the retention plate faces against the attachment surface of the friction pad and the outboard surface of the retention plate faces against the inboard surface of the reinforcement plate.

12. The brake pad of claim 11, wherein the outboard facing surface of the reinforcement place includes a counterbore step in the mold hole.

13. The brake pad of claim 12, wherein the flanged edge rests entirely against the counterbore step.

* * * * *